Patented May 13, 1952

2,596,631

UNITED STATES PATENT OFFICE 2,596,631

ACYLATED AMINO ACID SILVER SALTS

Francis M. Whitacre, Manhasset, and Dina Van Praag, New York, N. Y., assignors to Schieffelin & Co., New York, N. Y., a corporation of New York No Drawing. Application June 14, 1948, Serial No. 32,993

5 Claims. (Cl. 260—430)

This invention relates to chemotherapeutic agents or compounds active against pathogenic micro-organisms and more particularly to compounds comprising the silver salts of the acylated essential alpha-amino acids. By the expression "essential alpha-amino acids" it is intended to include those grouped together as such on the rat basis, which are: lysine, tryptophane, methionine, histidine, phenylalanine, leucine, iso-leucine, threonine, valine and arginine. A preferred class of acids comprises the acylated essential sulphur-containing alpha-amino acids.

One of the advantages of the invention is that it provides effective chemotherapeutic agents in a form which is readily assimilable by pathogenic micro-organisms and which, in addition, are essential in their metabolism. In the preparation of the agents, the amino acids described above are the starting materials, and an acyl group is introduced in the amino group of the acids. The acyl group may be cyclic or acyclic, saturated or unsaturated, and in addition may be substituted by other groups such as the halogen, hydroxyl, keto, amino etc. groups. For example, the acyl group may be acetyl, propionyl, butyryl, benzoyl, salicylyl, etc. The acylated acid is then isolated from the reaction mixture and reacted with a suitable silver salt. The following are examples of specific silver salts of acylated essential alpha-amino acids: silver acetyl methionine, silver propionyl methionine; silver salicylyl methionine, silver acetyl leucine, silver acetyl tryptophane, silver butyryl methionine, silver butyryl tryptophane, silver benzoyl leucine, silver acetyl lysine, silver propionyl histidine, etc. Examples of the preparation of a few compounds are as follows:

Example 1

Ten gms. of l-leucine were dissolved in 20 cc. water and 20 cc. of 2 N caustic soda and kept in an ice bath. A mixture of 1 cc. of propionyl anhydride and 10 cc. of 2 N caustic soda was added, with stirring, about every 5 minutes until ten such additions had been made. The reaction mixture was left to stand at room temperature for a while, and then 40 cc. of 6 N sulfuric acid was added, whereupon a heavy white precipitate of propionyl leucine was formed. The precipitate was recovered and dissolved in water. Then a solution of sodium bicarbonate was added to a silver nitrate solution to form a precipitate of silver carbonate, which was separated. The solution of propionyl leucine was poured over the solid silver carbonate to form a clear solution of the silver salt of propionyl leucine. The salt was recovered from the solution by evaporating the latter on the steam bath under reduced pressure. It has the formula:

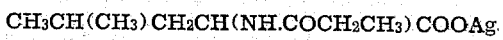

Example 2

Ten gms. of methionine were dissolved in 20 cc. water and 35 cc. of 2 N caustic soda and placed in an ice bath. A mixture of 2 cc. of propionyl anhydride and 20 cc. of 2 N caustic soda was added, with stirring, at intervals of about 5 minutes until eight additions were made. The resulting mixture was left to stand at room temperature for a while. Then 65 cc. of 6 N sulfuric acid was added to the mixture. The propionyl methionine which was formed was extracted from the solution as follows: the sodium sulfate which was formed was salted out with 800 cc. of ethanol and the mixture filtered. The ethanol was distilled off, and the residue was extracted with hot ethyl acetate. On cooling, fine white crystals of propionyl methionine were formed. The latter was then dissolved in water and poured over silver carbonate to form a solution of silver propionyl methionine. The salt was recovered from the solution by evaporation on the steam bath under reduced pressure. Its formula is:

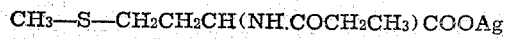

Example 3

Fifty gms. of acetylsalicylic acid, or aspirin, were placed in a 500 cc. flask, 50 cc. of thionyl chloride were added and then 3 to 4 drops of pyridine, following which the mixture was placed on a steam bath until a clear, deep brown, liquid was formed. The excess of thionyl chloride was removed by distillation. The remaining material was extracted three times with 25 cc. portions of anhydrous benzene. The benzene was then distilled from the extract, leaving acetylsalicylic chloride. Four gms. of methionine were then dissolved in 60 cc. of water and 20 cc. of 2 N caustic soda, while cooling and stirring. At 5-minute intervals, eight additions of 20 cc. of 2 N caustic soda containing 1 cc. of acetylsalicylic chloride were made to this solution. The resulting mixture was heated on a steam bath, then cooled to room temperature, and 33.5 cc. of 6 N sulfuric acid were added. An oily-solid precipitate, salicylyl methionine, was formed, which was finally crystallized from water. M. P. 117°–118° C. Thereafter it was dissolved in 1 N caustic soda solution and a solution of silver nitrate added thereto to form the silver salt of salicylyl methionine which precipitated out from the solution. Its formula is:

CH₃—S—CH₂CH₂CH(NH.CO.C₆H₄.OH)COOAg

Example 4

Acetyl leucine was prepared similar to the manner in which propionyl leucine was prepared in Example 1. Then 2 gms. of silver nitrate were dissolved in water, and a solution of sodium bicarbonate added thereto to form a bright yellow precipitate of silver carbonate. This precipitate was then added to a water solution of acetyl leucine, a clear solution of silver acetyl leucine being formed. The excess of the silver carbonate was separated by decantation, and the solution of silver acetyl leucine evaporated to dryness under reduced pressure. It has the formula:

CH₃CH(CH₃)CH₂CH(NH.COCH₃)COOAg

Example 5

Ten gms. of methionine were dissolved in 20 cc. of water and 20 cc. of 2 N caustic soda and then cooled in an ice bath. Ten additions of 10 cc. of 2 N caustic soda and 1 cc. of acetic anhydride were made, each at 2-minute intervals. The solution was then left to stand at room temperature for a while and 40 cc. of 6 N sulfuric acid was added. After removal from the solution of the water and excess acetic anhydride by vacuum distillation, acetyl methionine was extracted with hot absolute ethyl acetate. The ethyl acetate was then evaporated and acetyl methionine was recrystallized from a minimum amount of ethyl acetate. M. P. 114°–115° C. A half gram of acetyl methionine was next dissolved in water. Silver carbonate, freshly prepared by adding 1 gm. of sodium bicarbonate to 1 gm. of silver nitrate solution, was then added to the latter solution. The excess silver carbonate was separated by decantation, and the clear solution of silver acetyl methionine evaporated under reduced pressure.

Example 6

Five gms. of tryptophane, 10 cc. of water, and 15 cc. of 2 N caustic soda were mixed while stirring and cooling to about 0°. Six additions of 10 cc. of 2 N caustic soda and 1 cc. of acetic anhydride were added at intervals of about 2 minutes. Then 25 cc. of 6 N sulfuric acid were added, and after standing for a while at room temperature, acetyl tryptophane precipitated out. M. P. 203°–204° C. Silver carbonate, prepared as described in Example 5, was then added to a solution of acetyl tryptophane, and the excess of silver carbonate separated by decantation. The resulting clear solution of silver acetyl tryptophane was evaporated under reduced pressure.

The compounds of the invention have shown themselves to be active against such microorganisms as *Staphylococcus aureus*, *Eberthella typhosa*, *trichomonosa vaginalis*, etc. By reason of its special activity, the preferred compound is silver propionyl methionine.

While the invention has been described in connection with more or less specific embodiments, it will be appreciated that it is capable of obvious variations without departing from its scope.

In the light of the foregoing description, the following is claimed:

1. As a chemotherapeutic agent active against pathogenic micro-organisms, a silver salt of an acylated essential sulphur-containing alpha-amino monocarboxylic acid of the formula $$\mathrm{R-\underset{HNR'}{\overset{}{C}}-COOAg}$$

wherein R is the residue of the essential sulphur-containing amino acid and R' is an acyl group.

2. As a chemotherapeutic agent active against pathogenic micro-organisms, a silver salt of acylated methionine having the formula $$\mathrm{CH_3SCH_2CH_2\underset{HNR'}{\overset{}{C}}HCOOAg}$$

wherein R' is an acyl group.

3. As a chemotherapeutic agent active against pathogenic micro-organisms, the silver salt of acetyl methionine having the formula $$\mathrm{CH_3SCH_2CH_2\underset{HNCOCH_3}{\overset{}{C}}HCOOAg}$$

4. As a chemotherapeutic agent active against pathogenic micro-organisms, the silver salt of propionyl methionine having the formula $$\mathrm{CH_3SCH_2CH_2\underset{HNCOCH_2CH_3}{\overset{}{C}}HCOOAg}$$

5. As a chemotherapeutic agent active against pathogenic micro-organisms, the silver salt of salicylyl methionine having the formula $$\mathrm{CH_3SCH_2CH_2\underset{HNCOC_6H_4OH}{\overset{}{C}}HCOOAg}$$

FRANCIS M. WHITACRE.
DINA VAN PRAAG.

REFERENCES CITED

The following references are of record in the file of this patent:

UNITED STATES PATENTS

| Number | Name | Date |
|---|---|---|
| 1,161,866 | Kautzsch | Nov. 30, 1915 |
| 2,250,553 | Ruskin | July 29, 1941 |

FOREIGN PATENTS

| Number | Country | Date |
|---|---|---|
| 249,764 | Germany | July 29, 1912 |

OTHER REFERENCES

Lowy et al., "Introduction to Organic Chemistry," 6th Edition, page 169. John Wiley and Sons, Inc., New York, 1946.

De Jong, "Rec. trav. chim. des Pays-Bas," vol. 19 (1900), pp, 293 to 295.

Schmidt, "Chemistry of the Amino Acids and Proteins," (1938), page 986.